United States Patent [19]
Jetzer

[11] 3,989,499
[45] Nov. 2, 1976

[54] CONVERSION OF REFUSE INTO FIBROUS MATERIAL

[75] Inventor: Raimund Jetzer, Nussbaumen, Switzerland

[73] Assignee: Jetzer Engineering AG, Vaduz, Liechtenstein

[22] Filed: Jan. 26, 1973

[21] Appl. No.: 327,234

Related U.S. Application Data

[63] Continuation-in-part of Ser. No. 7,996, Feb. 2, 1970, abandoned.

[30] Foreign Application Priority Data

May 17, 1972   Switzerland.......................... 7355/72

[52] U.S. Cl. ..................................... 71/9; 71/64 JC
[51] Int. Cl.² ......................................... C05F 11/08
[58] Field of Search .............................. 71/9, 64 JC

[56] References Cited
UNITED STATES PATENTS

| | | |
|---|---|---|
| 2,089,978 | 8/1937 | McNatt.................................. 71/14 |
| 2,699,629 | 1/1955 | Wandel.................................. 71/14 |
| 3,419,377 | 12/1968 | Redman................................. 71/14 |
| 3,533,775 | 10/1970 | Brown..................................... 71/9 |
| 3,579,320 | 5/1971 | Pesses..................................... 71/9 |

*Primary Examiner*—Charles N. Hart
*Assistant Examiner*—Ferris H. Lander
*Attorney, Agent, or Firm*—Michael J. Striker

[57] ABSTRACT

Household, agricultural, forestry, and/or commercial refuse containing a mix of organic substances which respectively decompose rapidly, less rapidly and slowly, is converted into a fibrous material by subjecting the refuse to aerobic decomposition which is interrupted after only the rapidly decomposable organic substances are decomposed, whereby a fibrous material is obtained which is thereupon dried and sterilized. A hardenable binder material may be admixed with the resultant dried fibrous material and the mixture may be shaped to desired configuration and the binder material hardened under simultaneous application of pressure to make a shaped body.

5 Claims, 1 Drawing Figure

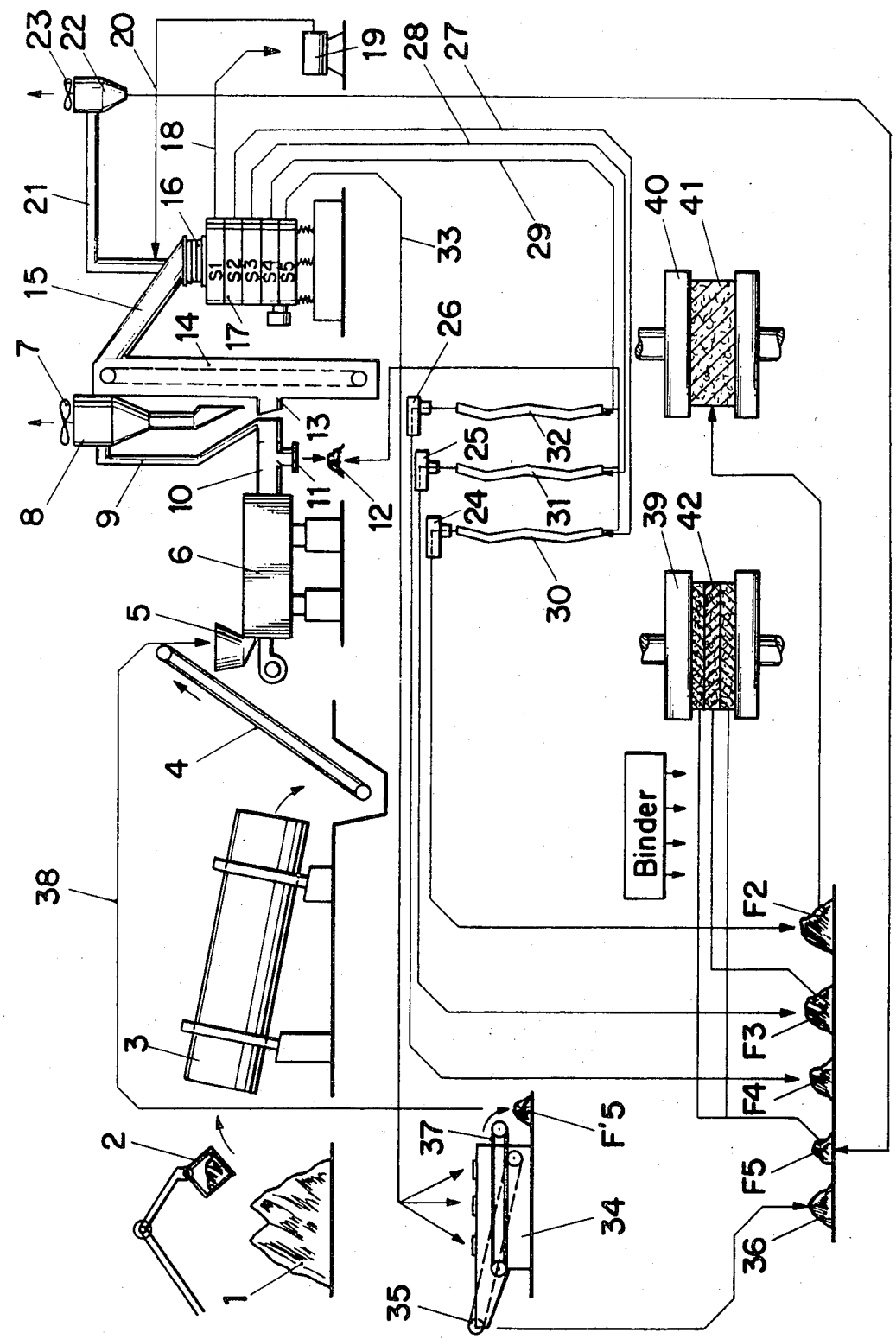

CONVERSION OF REFUSE INTO FIBROUS MATERIAL

BACKGROUND OF THE INVENTION

This is a continuation-in-part of my earlier filed application Ser. No. 7,996, filed on Feb. 2, 1970 and now abandoned.

The present invention relates generally to the production of fibrous material from refuse by aerobic decomposition of the same.

More particularly the invention relates to a method of producing such a fibrous material from household refuse, agricultural refuse, forestry refuse and/or commercial refuse consisting of or containing a mix of organic substances some of which are rapidly decomposable, others of which are less rapidly decomposable and still others of which are slowly decomposable.

It is already known from my aforementioned copending application to produce a fibrous material from household, agricultural, forestry and/or commercial refuse by subjecting the refuse to aerobic decomposition. This results in the formation of an aerobic fermentation substrate, which is dried to have a water content or moisture content of less than 10% and is sterilized, to thereby obtain a finely structured dry fiber granulate. This is then admixed with a synthetic plastic resin material and shaped to a desired configuration, the resin material being hardened and pressure being applied during the hardening to obtain a shaped body.

I have now found that the mechanical strength characteristics obtainable for a shaped body made in accordance with my aforementioned copending application, can be further improved, if the dry fibrous matter which is admixed with the resin binder has longer fibers than those which are obtained in accordance with my previous application.

SUMMARY OF THE INVENTION

It is, accordingly, an object of the present invention to provide an improved method of making a fibrous material from household, agricultural, forestry and/or commercial refuse.

More particularly it is an object of the present invention to provide such a method which will produce a fibrous material having fibers which are longer than those previously attained.

Another object of the invention is to provide an improved shaped body made with the aid of fibrous material obtained according to the present invention.

Still another object is to provide an improved fibrous material obtained in accordance with the method of the present invention.

In keeping with these objects, and others which will become apparent hereafter, one feature of the invention resides in a method of producing a fibrous material from household, agricultural, forestry and/or commercial refuse containing a mix of organic substances that can respectively decompose rapidly, less rapidly and slowly. This method comprises, briefly stated, the steps of subjecting the refuse to aerobic decomposition, interrupting the aerobic decomposition of the refuse after only the rapidly decomposable organic substances are decomposed, whereby to obtain a fibrous material, and drying the thus obtained fibrous material.

When a substance containing aerobically decomposable matter is subjected to such aerobic decompositon, the substance (here the refuse) is decomposed by the action of soil bacteria. These are very highly resistant bacteria which are capable of surviving at rather low as well as rather high temperatures. It has been observed, however, that they develop most rapidly in the presence of a moisture content of approximately 40% and at a temperature of approximately 50° C. Refuse of the type in question always contains a mix of organic substances of which some will decompose rapidly, others less rapidly and still others will decompose slowly under the action of the soil bacteria. If proper conditions for the development and action of the soil bacteria are produced, they will first decompose the rapidly decomposable substances such as sugar, starch and proteins. Only after these rapidly decomposable substances have gone, will the soil bacteria attack and decompose the lss rapidly decomposable substances, such as celluior, and only after that will they attack the slowly decomposable substances such as lignin. If, now, the bacteria are not allowed to attack the fibrous structure of cellulose and lignin in the refuse, due to the fact that the aerobic decomposition process has been interrupted after the bacteria have decomposed the rapidly decomposable substances, the product which is obtained after completion of this partial decomposition will have a rather long fiber, that is a fiber which is much longer that what can be obtained if the decomposition is allowed to proceed and the bacteria are permitted to decompose the less rapidly and finally slowly decomposable substances. Generally speaking, the shorter the period of aerobic decomposition, the longer will be the fibers of the resulting substances.

The fibrous material thus obtained can then be admixed with a hardenable binder material or agent, for instance a synthetic plastic resin material, and can be shaped to a desired configuration, for instance a panel-shape, in which it is subjected to pressure and the agent is caused to harden, to thereby produce a finished shaped body. This makes it possible to convert the huge quantities of such refuse, especially of household refuse, which have become one of the big problems of all municipalities, into useful material such as panels, plates or the like that can be further processed for use in the building industry or for other applications, while at the same time to eliminate the necessity for the expensive disposal of the refuse.

It is a further advantage of the present invention that the aerobic decomposition time is decreased substantially, and amounts at most to half of the time previously required. It is conventional to process refuse of this type in fermentation drums, fermentation towers or in open fermentation silos and then to attempt to use the resulting material as compost, that is as fertilizer. The invention now makes it possible to increase the throughput capacity of existing installations to a point where it is substantially doubled, or else to obtain the same throughput with smaller and therefore less expensive installations. Moreover, instead of being left with compost which must still be disposed of, an undertaking which frequently has not been very successful, the product resulting at the end of the only partial aerobic decomposition which is envisioned according to the present invention can be readily converted into raw material suitable for further applications, that is into the aforementioned shaped bodies which can be used for erecting walls, buildings or other structures, to name just some possibilities.

Still another advantage of the present invention is that the fibers in the only partially aerobically decomposed refuse do not tend to roll up and form granule-shaped configurations, because their dwell time in the decomposing equipment, usually fermentation drums in which the refuse is agitated as it undergoes decomposition, is now of course much shorter than previously. This means that they tend to stay straight or substantialy straight, rather than rolling up into tight coils as has been previously observed, and these fibers produced according to the present invention are therefore much more readily convertable into shaped bodies after admixture with synthetic plastic resin binder and other substances which it may be desired to add, such as colorants, fungicides, insecticides or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a diagrammatic illustration showing an installation capable of carrying out the present invention.

DESCRIPTION OF THE PREFERRED EMBODIMENTS

In the Figure of the drawing I have illustrated an installation which can carry out the various stages of the present invention. I have done so for a better understanding of the invention but it is believed that a diagrammatic illustration will suffice.

Reference numeral 1 identifies refuse, such as household refuse, agricultural refuse, forestry and/or commercial refuse. It has been determined that the most common composition of ordinary household refuse is between 4 and 5% of glass, between 0.2 and 0.5% of non-ferrous metals, between 3 and 5% of iron, between 0.5 and 1% of bread and bones, between 2 and 3% of textile materials, between 2 and 3% of synthetic plastics, leather and wood, 15% of wet kitchen garbage, 5% of plant matter such as might be derived from a garden, and 65% of paper and packaging materials. Of these materials, the iron is removed, for instance magnetically, before further processing.

A suitable gripper 2 admits the refuse into a rotating fermentation drum 3 of a type known per se, for instance available from Danu Company of Copenhagen, Denmark, or from Buehler AG of Uzwil, Switzerland.

In conventional aerobic decomposition, which is carried out in the fermentation drum 3, the decomposition period may last between 2 and 4 days during which the refuse undergoes in the drum 3 an aerobic decompositon process and is also subjected to size reduction due to the rotation of the drum. According to the present invention, however, the treatment (i.e. the aerobic decomposition) of the refuse in the drum 3 is terminated when the rapidly decomposable organic substances contained in the refuse are decomposed. In other words, the aerobic decomposition process is not allowed to proceed beyond the decomposition of the rapidly decomposable substances, so that decomposition of the less rapidly decomposable substances either is not allowed to begin or is at least not allowed to proceed to any appreciable extent.

The speed at which the decomposition process proceeds depends largely upon the moisture content of the refuse and upon the temperature at which the refuse is maintained during the decomposition. It also depends upon whether the decomposition process takes place in a stationary or rotating fermentation drum, or in a fermentation silo. The most rapid decomposition is obtained in the rotating fermentation drum 3 when the moisture content of the refuse is approximately 40% and if the refuse is maintained at a temperature of approximately 52° C. If the moisture content is higher or lower than approximately 40%, then the speed of decomposition decreases, and similarly a decrease is observed if the temperature is higher or lower than substantially 52° C. Generally speaking it may be said that if the time required to produce a complete aerobic decomposition process (i.e. to decompose the rapidly, less rapidly and slowly decomposable substances) requires T hours (for instance 72 hours), then the time required for obtaining the fibrous material desired according to the present invention (in which only the rapidly decomposable substances are decomposed) equals $\frac{2}{3} \times T$ hrs. (e.g. 48 hours).

When the desired degree of aerobic decomposition has been reached, the refuse is made to leave the drum 3 and to fall onto a belt conveyor 4 from where it is carried via c chute 5 into a drying oven 6. In the latter it is subjected to drying in order to reduce its water content to a desired extent, advantageously to below 10%, and where it may also be sterilized. A ventilator 7 is provided for withdrawing the liberated gases from the oven via a cyclone 8, a conduit 9 and a horizontal tube 10 having a downwardly directed open end 11, followed in the flow direction of the gases by a baffle 12. The latter also serves to reduce the flow speed of the gases and permits a descent of coarse particles of heavy specific weight, for instance stones, so that these will fall through the opening 11.

The cyclone 8 yields a fiber material which is now admitted into an enclosed bucket elevator 14 and from the same via a slide 15 into a inlet opening 16 of a screen housing 17 which is mounted on springs (not shown) so that it can vibrate and which oscillate and is provided with a similarly non-illustrated vibratory drive. Such drives are well-known, and their purpose is to transmit vibration to a component, here to the housing 17.

Screens S1, S2, S3 and S4 as well as a receptacle S5 may be mounted in the housing 17 in vertically superimposed relationship. The mesh of the screens should decrease in the downward direction, meaning that the screen S1 has the largest mesh and S4 the smallest. Each of the screens as well as the receptacle S5 has an outlet opening. The largest or coarsest fraction of the fibrous material will be retained on the screen S1 because, due to the large mesh of the latter, all but the coarsest matter will pass through it. The fraction retained by the screen S1 is advanced by a conveying device 18 to a comminutor 19 where it may be mechanically reduced in size to the size which is considered optimum. Afterwards it may be returned by the conveying device 20 to the inlet opening 16 of the inlet housing 17 and once again pass through the segregating cycle. A suction conduit 21 communicates with the opening 16 and is connected via a cyclone 22 with a suction intake of a centrifugal blower 23. Of course, other suction sources could be utilized. The blower 23 draws air through the outlet openings of the screens S1

— S4 as well as the outlet opening of the receptacle S5. The air is further drawn to the funnel 13 and the elevator housing 14 and due to this, dust and some of the smallest fraction is withdrawn from the fibrous mass admitted via the inlet opening 16, and separated in the cyclone 22 from the airstream. Additionally, the air aspirated by the blower 23 provides for cooling of the still warm or hot fibrous matter in the bucket elevator housing 14 and in the housing 17. Finally, clogging of the screens S1 - S4 by dust and the inevitable resulting decrease in efficiency, are avoided by this measure.

The material from which the coarsest has already been removed now passes through the screens S2, S3, S4. The first screen S2 retains a fraction which is finer than the coasest and is designated as F2. The screens S3 and S4 retain the fractions F3 and F4, with the latter being the finest fraction. The retained fractions F2, F3 and F4 are withdrawn by respective centrifugal blowers 24, 25 and 26 via conduits 27, 28 and 29. During such withdrawal the fractions pass through air-sifting or separating devices 30, 31 and 32, respectively. The flow speed of air in the devices 30–32 is so selected that the respective fibrous material of the fraction being processed will float upwardly with the air in the device, whereas the heavier particles of the fractions will drop downward and leave the respective device 30, 31 or 32. These particles can then be added to the particles which issue through opening 11; inasmuch as such particles are mostly stones or glass pieces, they can be deposited in suitable outdoor dumps without any danger of environmental contamination.

The fractions F2, F3 and F4 which have now been cleaned in the devices 30 - 32, respectively, of heavy contaminants are then drawn by the air aspirated by the blowers 24-26 into separate storage units. The portion of the finest fraction F5 which has been drawn into the cyclone 22 and separated therein from the airstream is also admitted into a storage unit. From the container S5 the smallest fraction is advanced via conveying device 33 into the wet separator 34 where the heavy particles such as grains of sand and pieces of glass, are separated from the remainder of the fraction and removed separately via a conveyor belt 35, to be introduced into a storage unit 36. The lightweight components of the finest fraction are deposited wet onto a conveyor belt 37 which advances them to an intermediate storage device F'5 from where they are transported by the conveying device 38 through the funnel 5 into the drying apparatus 6, to be dried and subsequently returned into the segregating cycle.

The segregated and cleaned fractions can be admixed with the binder as outlined earlier, and can be pressed in presses 39 or 40 to form one-layer plates 41, or to form in any desired combination dual, triple or multiple-layer plates 42 or any other desired shape.

The installation illustrated in the Figure and just discussed is purely exemplary, as is the segregation of the fibrous material into several different-sized fractions. The present invention is concerned not with the apparatus or installation as described, or with the segregation into different fractions, but instead with the fact that fibrous material is produced by subjecting the refuse to aerobic decomposition only for such length of time as is necessary for the rapidly decomposable organic substances in the refuse to become decomposed, but not the less rapidly or slowly decomposable substances. From the thus obtained fibrous material, shaped bodies can be made in accordance with the present disclosure, by adding hardenable binder material, shaping the mixture and subjecting the mixture to pressure and to heat and to the usual procedure in which the binder material is caused to harden.

The following

EXAMPLE will indicate the results of two comparison tests which were carried out, one according to the present invention and one according to the prior art.

100 kg of household refuse of the type discussed earlier were coarsely comminuted and homogenized and were then subdivided into two equal amounts. Homogenization was carried out only to such extent that both equal-weight amounts had the same analysis as to contents.

The first half of the refuse quantity, that is the half which served to carry out a control test, was subjected to aerobic decomposition in a rotating fermentation drum in accordance with the prior art, for a period of 72 hours. An aerobic substrate was obtained, and during the decomposition the content of moisture of the refuse in the fermentation drum was approximately 40% and the refuse was maintained at approximately 52° C. The decomposed substrate was examined and it was found that the readily or rapidly decomposable substances, such as sugar, starches and proteins, were completely decomposed. The less rapidly decomposable substances, such as cellulose, were largely decomposed and the slowly decomposable substances, such as lignin, were partly decomposed. The thus obtained substrate was immediately dried in a flow-through drying apparatus at between 150° and 400° C, to a final moisture content of approximately 5%. The level of the drying temperature at the same time also caused the fibrous material obtained to be sterilized.

The fibrous material which was obtained in this manner was what I prefer to call "fibrous granulate", that is its fibers had curved up into tight balls or coils rather than remaining elongated.

The second half of the refuse was subjected to aerobic decomposition in the same rotating fermentation drum, but only for a period of 48 hours. The moisture content of the refuse in the drum during the aerobic decomposition was approximately 45% and the refuse was maintained at a temperature of 51.5° C. The fibrous material which was removed from the drum after the partial aerobic decomposition lasting 48 hours, was examined and it was found that the readily or rapidly decomposable organic substances had been completely decomposed. The less rapidly decomposable substances were largely present and the slowly decomposable substances were completely present. The fibrous material thus obtained was then dried at approximately 150° C untl it had a final moisture content of approximately 5%, and it was sterilized.

A comparison of the fibrous material obtained in this manner with the fibrous material obtained according to the control experiment indicated visually that the fibrous material produced according to the present invention had elongated fibers which were considerably longer than those of the control test. The fibers in the control test had, as was previously pointed out, a tendency to form tight balls or coils, whereas this tendency was much less pronounced in the fibers produced according to the present invention, which tended to remain elongated.

The contents removed from the fermentation drum upon completion of the 72 hour aerobic composition in the control test, and the contents removed from the fermentation drum upon completion of the partial decomposition in the test of the method according to the present invention, had the following composition:

| Water | approximately | 49% |
|---|---|---|
| Dry substance | approximately | 51% |
| Total losses | approximately | 73%. |

The fiber granulate obtained in the control test, and the fibrous material obtained in the test according to the present invention had the following composition:

| Carbon | approximately | 33% |
|---|---|---|
| Hydrogen | approximately | 4% |
| Oxygen | approximately | 12% |
| Nitrogen | approximately | 1% |
| Sulfur | approximately | 0.3% |
| Chlorine | approximately | 1.5% |
| Phosphorus | approximately | 0.5% |
| Ash | approximately | 45%. |

Now the fiber granulate and the fibrous material were each further processed to form press panels or plates from them, and the thus obtained plates were subsequently subjected to mechanical strength testing.

To produce the plates 2,400 g of the fiber granulate were admixed with a synthetic resin binder having a resin content of 8% and with 1% of wax emulsion, and were subjected to pressure to form a one-layer plate of 40 × 50 cm having a thickness of 15 mm, at a density of approximately 800 kg/mm$^3$. The material was, during the application of pressure, heated to 190° C and the pressure was maintained during a period of 10 minutes at 20 kg/cm$^2$ and was subsequently reduced to a lower holding pressure.

A similar plate was produced in exactly the same manner, except that here the resin binder material was admixed with fibrous material obtained in the test according to the present invention.

The two plates thus produced were tested in accordance with DIN norm and the following results were obtained:

| [a] | The layer made with fiber granulates | |
|---|---|---|
| | Bending strength | 43 kg/cm$^2$ |
| | Transverse tension resistance | 1.85 kg/cm$^2$ |
| [b] | The plate using the fibrous material according to the present method: | |
| | Bending strength | 50 kg/cm$^2$ |
| | Transverse tensile strength | 2.1 kg/cm$^2$ |

The above values constitute the arithmetic means of three different tests in each case, which tests were carried out under identical conditions.

It was thus found that the plate or panel produced with the fibrous material obtained according to the present method has strength characteristics which are higher by approximately 15% than those existing in a plate or panel made with the fibrous granulate produced in accordance with the prior art.

Examinations have shown that the resin binder is able to better penetrate into the fibers of the fibrous material produced in accordance with the present method, than into the fiber granulate according to the prior art. This counteracts a splitting of the individual fibers when the plate, panel or the body is subjected to mechanical stresses.

In addition it was found that in the one-layer plates which were tested the mechanical strength with the fibrous material according to the present invention can be made to equal the strength of the panels produced with the fibrous granulate according to the prior art, but using less synthetic resin binder, so that the production of shaped bodies with the fibrous material according to the present invention is more economical.

What is important to keep in mind in the context of the present invention is that, by subjecting the refuse to aerobic decomposition only to the point where the rapidly decomposable organic substances of refuse are decomposed, whereas the less rapidly decomposable ones are at most slightly decomposed and the slowly decomposable ones are not decomposed at all, there is obtained a fibrous material whose fibers are elongated and do not curl up or roll themselves into a ball, as is the case according to the prior art where the refuse is subjected to aerobic decomposition until all of the organic substances are completely or at least substantially decomposed. Evidently, the fact that the fibers are elongated means that they can intertwine better and that there is a better interconnection and embedding of the fibers in the synthetic plastic resin binder than if the fibers are curved into coils or balls.

It will be understood that each of the elements described above, or two or more together, may also find a useful application in other types of applications differing from the types described above.

While the invention has been illustrated and described as embodied in the production of fibrous material from refuse by aerobic decomposition, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of producing a fibrous material from household, agricultural, forestry and/or commercial refuse containing a mix of substances which, respectively, have a more rapid decomposition rate substantially equal to that of sugar, proteins and starches, a less rapid decomposition rate substantially equal to that of cellulose, and a slower decomposition rate substantially equal to that of lignin, said method comprising the steps of subjecting said refuse to aerobic decomposition; interrupting said aerobic decomposition after substantially only the substances having said more rapid decomposition rate are decomposed so as to obtain a fibrous material; and drying said fibrous material, whereby to obtain a product having relatively straight and long fibers.

2. A method as defined in claim 1, wherein said drying comprises sterilizing said fibrous material.

3. A method as defined in claim 1, wherein said drying comprises sterilizing said fibrous material by subjecting it to heat in excess of 100° C.

4. A fibrous material produced by subjecting refuse containing a mix of substances which, respectively, have a more rapid decomposition rate substantially equal to that of sugar, proteins and starches, a less rapid decomposition rate substantially equal to that of cellulose, and a slower decomposition rate substantially equal to that of lignin to aerobic decomposition until substantially only the substances having said more rapid decomposition rate are decomposed, and drying the resulting fibrous material.

5. A fibrous material as defined in claim 4, wherein said refuse is from the group composed of household, agricultural, forestry and commercial refuse.

* * * * *